(12) United States Patent
Kuboshima et al.

(10) Patent No.: US 7,028,467 B2
(45) Date of Patent: Apr. 18, 2006

(54) EXHAUST EMISSION CONTROL DEVICE FOR INTERNAL COMBUSTION ENGINE

(75) Inventors: Tsukasa Kuboshima, Okazaki (JP);
Shinichiro Okugawa, Toyota (JP);
Hironobu Baba, Obu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/776,244

(22) Filed: Feb. 12, 2004

(65) Prior Publication Data
US 2004/0159099 A1    Aug. 19, 2004

(30) Foreign Application Priority Data
Feb. 13, 2003    (JP)    ............... 2003-035276

(51) Int. Cl.
*F01N 3/00*    (2006.01)
(52) U.S. Cl. ............... 60/297; 60/274; 60/277; 60/311; 73/1.88; 73/700; 73/708
(58) Field of Classification Search ............... 60/274, 60/276, 277, 297, 303, 311; 73/1.88, 23.21, 73/23.25, 23.31, 118.1, 700, 708
See application file for complete search history.

(56) References Cited
U.S. PATENT DOCUMENTS
4,570,490 A * 2/1986 Antonazzi ............... 73/701

| | | | |
|---|---|---|---|
| 5,115,687 A * | 5/1992 | Clingman et al. | 73/863.61 |
| 5,211,009 A * | 5/1993 | Houben et al. | 60/274 |
| 5,329,818 A * | 7/1994 | Frick et al. | 73/708 |
| 6,237,394 B1 * | 5/2001 | Harris et al. | 73/1.88 |
| 6,422,001 B1 * | 7/2002 | Sherman et al. | 60/274 |

FOREIGN PATENT DOCUMENTS

| JP | 06299841 A | * 10/1994 |
|---|---|---|
| JP | 6-341311 | 12/1994 |
| JP | 2002206419 A | * 7/2002 |

* cited by examiner

*Primary Examiner*—Tu M. Nguyen
(74) *Attorney, Agent, or Firm*—Nixon & Vanderhye P.C.

(57) ABSTRACT

An engine exhaust emission control device determines a differential pressure across a diesel particulate filter (DPF) to enable regeneration of the DPF at optimal timing. An ECU estimates the temperature of a differential pressure sensor provided for the DPF from the output of an intake air temperature sensor when the engine is not running, and determines an offset correction factor for correcting the sensor's offset error. The factor is set using the sensor output at this time as sensor's offset error, and stored in a memory. When detecting the differential pressure across the DPF, the temperature of the sensor at this time is estimated, and an offset correction factor that corresponds to this estimated temperature is selected. The sensor outputs are adjusted with this offset correction factor.

12 Claims, 6 Drawing Sheets

FIG. 3A INITIAL STAGE

| TEMPERATURE RANGE | T1 | T2 | T3 | T4 | T5 | T6 | T7 |
|---|---|---|---|---|---|---|---|
| OFFSET CORRECTION FACTOR | a | a | a | a | a | a | a |

FIG. 3B AFTER READING SENSOR OUTPUT FOR THE FIRST TIME — UPDATE

| TEMPERATURE RANGE | T1 | T2 | T3 | T4 | T5 | T6 | T7 |
|---|---|---|---|---|---|---|---|
| OFFSET CORRECTION FACTOR | b | B | b | b | b | b | b |

CHANGE ALL THE FACTORS TO THE UPDATE FACTOR OF T2

FIG. 3C AFTER READING SENSOR OUTPUT IN THE TEMPERATURE RANGE T4 — UPDATE

| TEMPERATURE RANGE | T1 | T2 | T3 | T4 | T5 | T6 | T7 |
|---|---|---|---|---|---|---|---|
| OFFSET CORRECTION FACTOR | b | B | d | C | b | b | b |

INTERPOLATION BETWEEN THE FACTORS OF T2 AND T4

FIG. 3D AFTER READING SENSOR OUTPUT IN THE TEMPERATURE RANGE T7 — UPDATE

| TEMPERATURE RANGE | T1 | T2 | T3 | T4 | T5 | T6 | T7 |
|---|---|---|---|---|---|---|---|
| OFFSET CORRECTION FACTOR | b | B | d | C | e | f | D |

INTERPOLATION BETWEEN THE FACTORS OF T4 AND T7

FIG. 3E AFTER READING SENSOR OUTPUT IN ALL TEMPERATURE RANGES

| TEMPERATURE RANGE | T1 | T2 | T3 | T4 | T5 | T6 | T7 |
|---|---|---|---|---|---|---|---|
| OFFSET CORRECTION FACTOR | H | B | G | C | E | F | D |

EXHAUST EMISSION CONTROL DEVICE FOR INTERNAL COMBUSTION ENGINE

CROSS REFERENCE TO RELATED APPLICATIONS

This application is based upon, claims the benefit of priority of, and incorporates by reference Japanese Patent Application No. 2003-35276 filed Feb. 13, 2003.

BACKGROUND OF THE INVENTION

1. Field of the Invention

The present invention relates to an exhaust emission control device for purifying exhaust from internal combustion engines by trapping exhaust particulates.

2. Description of the Related Art

Emission control requirements for internal combustion engines of automobiles are becoming increasingly stringent. Emission reduction of CO, HC, NOX and particulates such as soot and SOF contained in the exhaust is particularly required for compression-ignition (diesel cycle) engines that are fueled by diesel fuel. To trap particulate matter (PM) in the exhaust from diesel powered engines, a diesel particulate filter (DPF) is normally disposed in the exhaust passage. A DPF is regenerated by periodic oxidation of accumulated PM to retain its PM trapping capability. The oxidation takes place more stably in a catalyzed DPF because the catalyst carried on its filter substrate lowers the regeneration temperature. DPF is normally regenerated at a temperature of 600° C. or more by a supply of unburned HC by means of retarding injection timing or post injection.

Injection timing retard causes a loss in the engine output torque because it increases waste heat in combustion. Post injection is an injection of fuel that does not contribute to the combustion in the combustion chamber. Therefore, frequent regeneration of DPF before PM has been fully accumulated with these methods will increase fuel consumption and lower fuel economy. If regeneration is performed after a large amount of PM has been collected, the PM will be oxidized intensively and the temperature of the DPF will become too high, e.g., 1000° C., whereby the risk of damage to the DPF substrate or deterioration of the catalyst will increase. The DPF regeneration timing should therefore be suitably set based on the calculated amount of trapped PM. Since the PM amount differs from one engine to another, it must be calculated in real time.

Known techniques in the art determine the regeneration timing using the fact that PM accumulation causes an increase in pressure loss. Japanese Patent Laid-Open Publication No. Hei 6-341311 (1994) shows one example of such techniques; when the differential pressure across the DPF exceeds a preset upper limit, the DPF is regenerated. Today it is common to use a semiconductor pressure sensor for DPFs for detecting differential pressure. Semiconductor pressure sensors include a piezoelectric element that outputs electrical signals in accordance with flexure caused by pressure in a semiconductor thin film that forms a pressure detection surface. Furthermore, the sensors can be compactly designed.

The differential pressure across a DPF changes depending on the flow rate of exhaust passing through the filter, even though the amount of PM accumulated in the filter is the same. The differential pressure decreases when the exhaust flow rate is low when the vehicle is running at low speeds in urban areas, and increases when the exhaust flow rate is high when the vehicle is running at high speeds on highways.

Seasonal and regional temperature variations that can be very large must also be taken into consideration because they affect the temperature of the sensor that detects the differential pressure across the DPF. Pressure sensors used for DPFs therefore need to have a wide detection range and superior temperature characteristics, but these requirements are not fully met in reality.

SUMMARY OF THE INVENTION

The present invention was made in consideration of the foregoing circumstances, its object being to provide an exhaust emission control device of an internal combustion engine, which can determine a differential pressure across a DPF with high precision so as to enable regeneration of DPF at optimal timing.

To achieve the above object, a first aspect of the present invention pertains to an exhaust emission control device of an internal combustion engine including a diesel particulate filter disposed in an exhaust passage of the internal combustion engine for trapping particulates in exhaust. Furthermore, a pressure sensor detects a differential pressure across the diesel particulate filter to determine the timing for oxidizing the particulates accumulated in the diesel particulate filter based on the differential pressure which increases with the accumulation of the particulates. The device further includes means for estimating a temperature of the pressure sensor. A correction factor setting means performs a correction information acquiring process for reading output from the pressure sensor and an estimated temperature by the temperature estimating means when the engine is not running. The correction factor setting means further determines offset correction factors for removing offset errors of the pressure sensor, the offset errors being the difference between the read-out output from the sensor and an output from the pressure sensor at the time when the pressure is zero, which should be constant irrespective of temperature changes. The relationship between the offset correction factors and temperatures of the pressure sensor is stored in memory. A correction means reads the output from the pressure sensor and the estimated temperature by the temperature estimating means when the engine is running for measuring a differential pressure across the diesel particulate filter and selects one of the offset correction factors in the memory means which corresponds to the estimated temperature, so as to correct the output of the pressure sensor with the selected offset correction factor.

For example, in a case where a pressure sensor measures a differential pressure across the diesel particulate filter, and the engine is not running, the true value of the output from the pressure sensor should be zero irrespective of the amount of PM accumulated in the filter. This is because there is no flow of exhaust, and therefore the sensor outputs at this time are regarded as indicating offset errors. Offset correction factors determined based on these offset errors are matched with temperatures of the pressure sensor and preliminarily stored, so that the factors used when measuring the differential pressure across the filter are always in accordance with the temperature characteristics of the pressure sensor, which vary from one sensor to another. Because the sensor outputs are corrected in accordance with the sensor's temperature characteristics, measurement errors of the differential pressure are reduced even if there is a large change in the ambient temperature of the pressure sensor. The diesel particulate filter can thus be regenerated at correct times.

Direct readings from the pressure sensor stored as offset errors can also be regarded as offset correction factors. According to a second aspect of the invention, in the device of the first aspect, the correction factor setting means may be designed such that estimated temperatures of the pressure sensor are divided into a plurality of temperature ranges, and the memory means may store each of the offset correction factors so that it is matched with each temperature range. The number of temperature ranges may be set such as to be the minimum number necessary to ensure detection precision of differential pressures across the filter, so as to reduce the load on the memory means without sacrificing sensor precision.

According to a third aspect of the invention, in the device of the second aspect, the correction factor setting means may be designed such that, whenever a new offset correction factor is obtained for the same temperature range by the correction information acquiring process, this new factor replaces the previous one. By updating the offset correction factors based on the latest result by the correction information acquiring process, any secular changes in the sensor outputs are absorbed.

According to a fourth aspect of the invention, in the device of the third aspect, the correction factor setting means may be designed such that, when an offset correction factor that corresponds to a first temperature range is obtained by the correction information acquiring process, if another correction factor that corresponds to a second temperature range nearest to the first temperature range has already been obtained by the previously completed correction information acquiring process and if there is one or more temperature ranges between the first and second temperature ranges, then the offset correction factor of the temperature range sandwiched between the first and second temperature range is calculated by interpolation between the offset correction factors of the first and second temperature ranges.

Thereby, correction factors in accordance with the temperature characteristics of the pressure sensor can be obtained without performing the correction information acquiring process for all the temperature ranges Thus offset correction factors for all the temperature ranges of the individual pressure sensors are quickly obtained.

According to a fifth aspect of the invention, in the device of any one of the first to fourth aspects, the memory means may store relationships between gain correction factors and temperatures of the pressure sensor for removing gain errors resulting from gain variations of the pressure sensor, and the correction means may select one of the gain correction factors in the memory means which corresponds to the obtained estimated temperature, so as to correct the output of the pressure sensor with the selected gain correction factor. By thus compensating for gain errors caused by gain variations with the temperatures of the pressure sensor in addition to the correction of offset errors, measurement errors can further be reduced.

According to a sixth aspect of the present invention, an exhaust emission control device includes a diesel particulate filter disposed in an exhaust passage of an internal combustion engine for trapping particulates in the exhaust. Additionally, a pressure sensor detects a differential pressure across the diesel particulate filter to determine the timing for oxidizing the particulates accumulated in the filter based on the differential pressure, which increases with the accumulation of the particulates. The device further includes means for estimating a temperature of the pressure sensor, memory means for storing relationships between gain correction factors and temperatures of the pressure sensor for removing gain errors resulting from gain variations of the pressure sensor, and correction means that select one of the gain correction factors in the memory means which corresponds to the obtained estimated temperature, so as to correct the output of the pressure sensor with the selected gain correction factor.

By thus correcting the output of the pressure sensor in accordance with the temperature characteristics of the pressure sensor, detection errors are minimized even when there is a large change in the ambient temperature of the sensor. The timing for regeneration of the DPF is thus appropriately determined. Any of the first to sixth aspects of the invention is advantageously applied to a device that uses a semiconductor pressure sensor, which is sensitive to the ambient temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
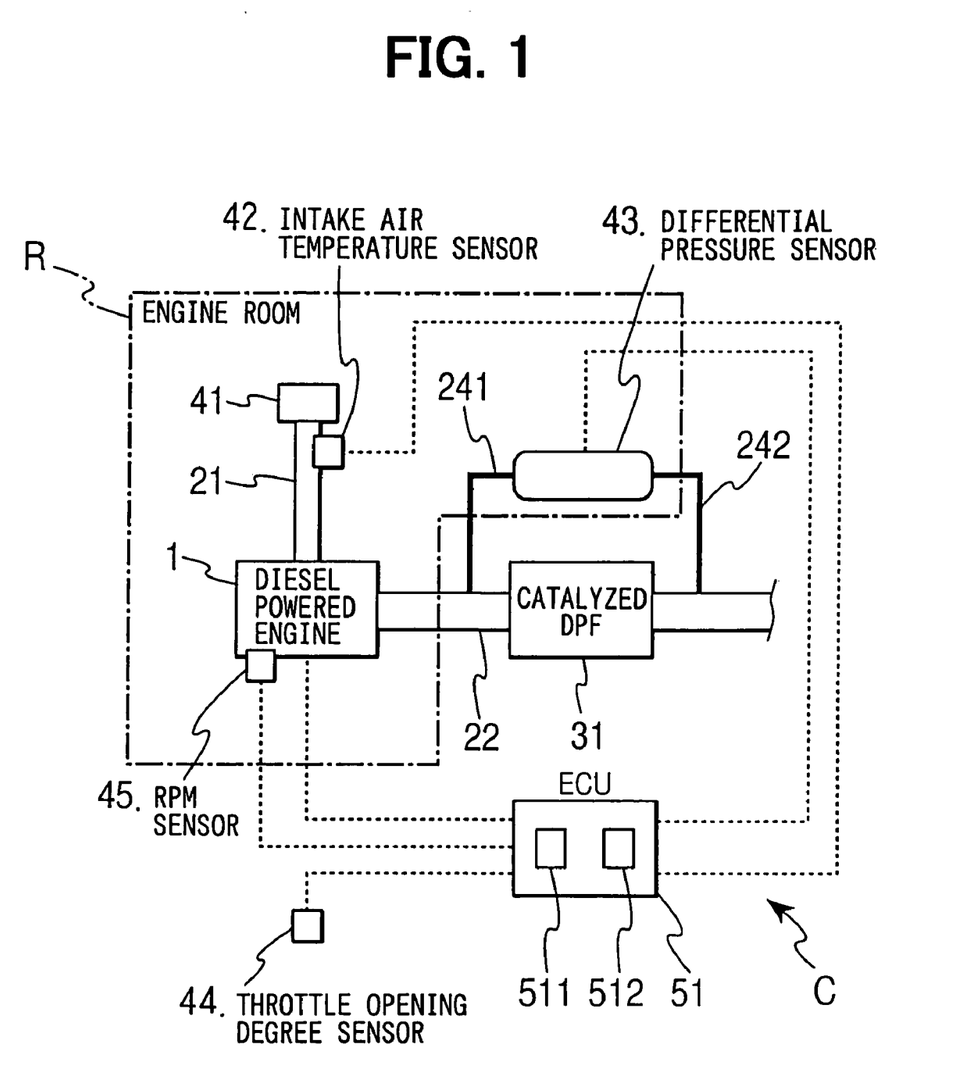
FIG. 1 is a schematic diagram of an internal combustion engine equipped with an exhaust emission control device according to the invention.

Preferred embodiments of the invention will be hereinafter described with reference to the accompanying drawings. FIG. 1 shows the overall structure of a diesel powered engine system equipped with the exhaust emission control device according to the invention. A catalyzed diesel particulate filter carrying an oxidation catalyst (hereinafter "catalyzed DPF") 31 is disposed in an exhaust passage 22 of the engine 1, as an exhaust treatment device. The catalyzed DPF 31 is made of heat resistant ceramic such as cordierite in a honeycomb structure that has multiple cells forming gas passages opened at one end and closed at the other end so that the passages are alternately closed at each end. An oxidation catalyst such as Pt is coated on the cell wall surface. The exhaust from the engine 1 flows downstream through porous partition walls of the catalyzed DPF 31, whereby particulates (PM) are trapped and gradually accumulated in the filter. The catalyzed DPF 31 is disposed outside of the engine room R, for example, directly below the engine room R.

A differential pressure sensor 43 for detecting a differential pressure across the catalyzed DPF 31 is provided so as to determine the amount of PM trapped and accumulated in the filter. The differential pressure sensor 43 is interposed between a pressure pipe 241 communicating to the exhaust passage 22 upstream of the catalyzed DPF 31 and another pressure pipe 242 communicating to the exhaust passage 22 downstream of the filter, and outputs signals to the ECU 51 in accordance with the differential pressure across the filter 31. The sensor 43 of this embodiment is a semiconductor pressure sensor.

An air flow meter (air intake sensor) 41 is provided in an intake passage 21 to detect an intake air amount, in accordance with signals input to the ECU 51. The air flow meter 41 is a known meter which indicates a mass flow rate of the intake air. In the intake pipe 21 is also provided an intake air temperature sensor 42, which detects the temperature of intake air and outputs signals to the ECU 51.

The ECU 51 also accepts input signals output from a throttle opening degree sensor 44 and an rpm sensor 45 as with any known engine system so as to determine the degree of opening of the accelerator and engine rotation number (engine rpm). The ECU 51 executes control of the engine 1 with an optimal fuel injection amount and injection timing and pressure calculated in accordance with driving conditions.

Figure 2:
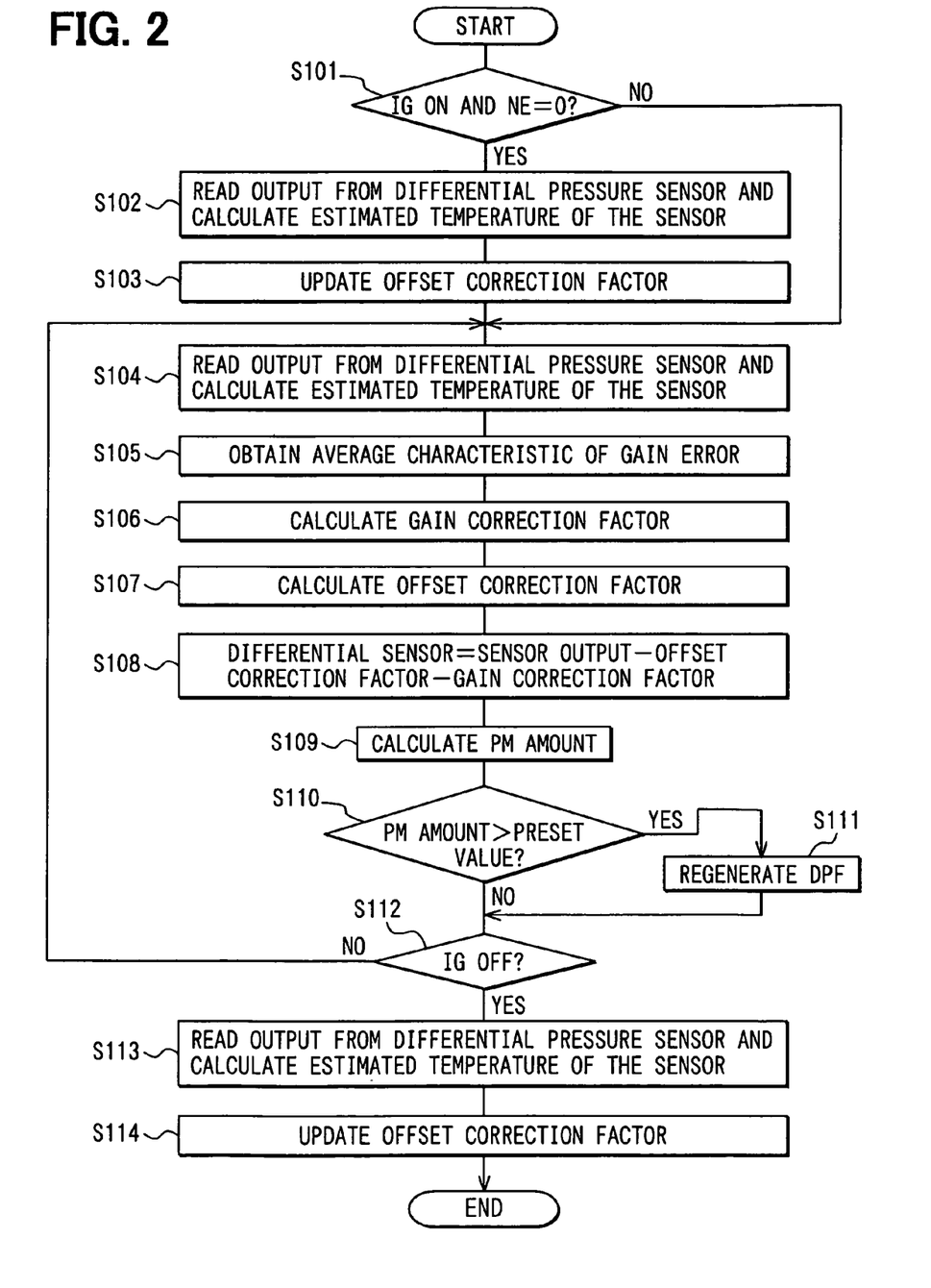
FIG. 2 is a flowchart of regeneration control of an electronic control unit (ECU) incorporated in the exhaust emission control device.

The ECU 51 includes an arithmetic unit 511 and a memory 512 and is made up of a microcomputer and peripheral circuits (not shown). Memory 512 consists of RAM, as an operation field of the arithmetic unit 511, and ROM for storing control programs and the like. FIG. 2 shows a control routine that is invoked by timer interruption, periodically, in the ECU 51. At step S101, it is determined whether or not the ignition switch is ON and the engine rpm NE is zero. If the engine is not running, the process continues to the next step S102. The requirement that the ignition switch be ON is provided to confirm that the ECU 51 is powered.

Steps S102 and S103 are processes performed as means of setting correction factors. At step S102, a correction information acquiring process is performed. That is, a differential pressure is determined from the outputs of the differential pressure sensor 43, and an estimated temperature of the sensor 43 is calculated based on the outputs from the intake air temperature sensor 42.

Offset correction factors are updated at the next step S103. Offset correction is made to remove offset errors by a subtraction and multiplication to the outputs of the differential pressure sensor. The memory 512 contains an offset correction map indicating respective correlation between seven temperature ranges and seven offset correction factors in this embodiment. Each temperature range has the same range width such as to cover temperature variations that are expected in consideration of the environment in which the vehicle with this exhaust emission control device is used. FIG. 3 shows five steps of the process of updating the offset correction factors in the map. Temperatures T1 to T7 are temperatures representing the seven temperature ranges, respectively, for example, mid-temperatures. In the following description, each temperature range will be referred to as "temperature ranges T1–T7." The offset correction factors in the illustrated example are all "a," which is, for example, zero.

Updating is made first for one of the temperature ranges T1–T7, to which the estimated temperature of the differential pressure sensor obtained at step S102 belongs. The new correction factor is determined based on the outputs from the differential pressure sensor obtained at step S102. When the engine rpm NE is zero, the true value of the output from the sensor should also be zero irrespective of the amount of PM accumulated on DPF, because there is no flow of exhaust, and therefore the outputs of the sensor 43 at this time are regarded as indicating offset errors and can be used as offset correction factors. Alternatively, the offset errors may be leveled by multiplying a certain coefficient. The updating of offset correction factors is repeated several times while the engine is not running, specifically at step S103 and step S114 to be described later. The factors are thus changed as shown in the drawing, as will be described in detail later.

Step S103 is followed by step S104. If NO is decided in step S101, where it is determined whether the ignition switch is ON and the engine rpm NE is zero, the process skips the steps S102 and S103 and goes to S104. At step S104, similarly to step S102, a differential pressure is determined based on the outputs from the differential pressure sensor, and an estimated temperature of the sensor is calculated.

Differential pressure sensors have varying gain characteristics. At step S105, the average gain error characteristic is calculated from the estimated temperature of the sensor. Gain is the inclination of a function of pressure and signal output, and the gain error characteristic of the sensor 43 is proportional to the detected pressure. The "average gain error characteristic" means an average of gain error characteristics of sensors of the same type as the differential pressure sensor 43, and can be expressed, for example, as a coefficient that is multiplied to the outputs of the sensor. That is, the actual sensor outputs multiplied by this coefficient are the correction factors with which the sensor outputs should be adjusted. The memory 512 stores a gain error average characteristic map indicating average gain error characteristics of sensors corresponding to various temperature ranges that are set similarly to the offset correction map. The gain error average characteristic map is not updated unlike the offset correction map because gain error does not change much with time. Thus at step S105, an average characteristic is selected, which corresponds to the temperature range to which the estimated temperature of the sensor obtained at step S104 belongs. The gain error average characteristic map is common to any sensors of the same type.

At step S106, a gain correction factor is calculated that will be added to or subtracted from the sensor outputs to compensate for gain errors. The gain correction factor is proportional to the sensor outputs and the coefficient that defines the gain error average characteristic obtained at step S105.

At step S107, an offset correction factor corresponding to the estimated temperature of the sensor obtained at step S104 is retrieved from the offset correction factor map. Alternatively, the offset correction factor may be calculated from the factor corresponding to the temperature range to which the estimated temperature belongs and the factor of a neighboring temperature range.

At step S108, a differential pressure is calculated from the following equation (b 1):

$$\text{Differential pressure} = \text{Sensor output} - \text{Offset correction factor} - \text{Gain correction factor.} \quad (1)$$

Figure 4:
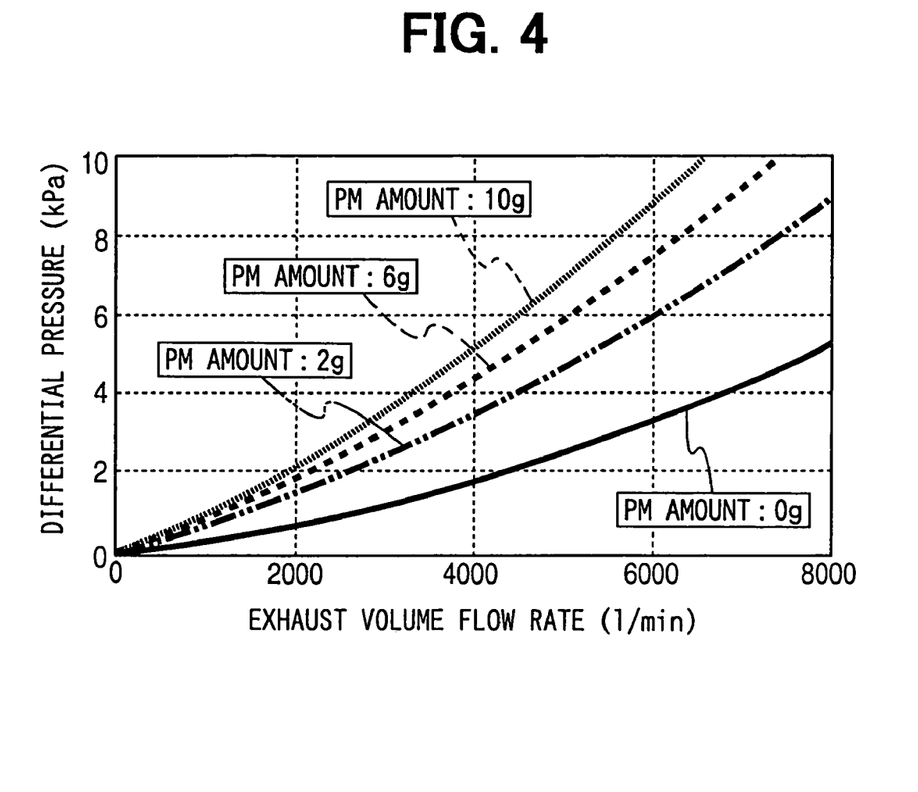
FIG. 4 is a graph showing the relationships between differential pressures across a catalyzed DPF and exhaust flow rates, and the amounts of accumulated PM.

At step S109, the amount of PM is calculated based on the differential pressure obtained at step S108. For the calculation of PM amount, exhaust volume flow rates are preliminarily obtained based on the intake air mass flow rates along with the differential pressure. This data is stored as a two-dimensional map that indicates PM amounts corresponding to respective differential pressures and exhaust volume flow rates. FIG. 4 shows one example of such a two-dimensional map. As shown, at each exhaust volume flow rate, the larger the differential pressure is, the greater the amount of PM, and at each differential pressure, the less the exhaust volume flow rate is, the greater the amount of PM. Any other known methods of calculating the PM amount based on the differential pressure may be used.

At step S110, it is determined whether or not the calculated PM amount is larger than a preset value, and if YES, the catalyzed DPF 31 is regenerated at step S111 by means of injection timing retard or post injection, and the process continues to the next step. If the calculated amount of PM is determined not to have reached the preset value at step S110, the process goes to step S112, skipping step S111.

At step S112, if it is determined that the ignition switch is OFF, then the process continues to step S113. If NO, the process goes back to step S104 and repeats the steps thereafter. Steps S113 and S114 are processes performed as a means of setting correction factors. At step S113, similarly to step S102, a differential pressure is determined based on the outputs from the differential pressure sensor 43, and an estimated temperature of the sensor is calculated. At step S114, similarly to step S103, an offset correction factor is obtained.

Figure 3A:
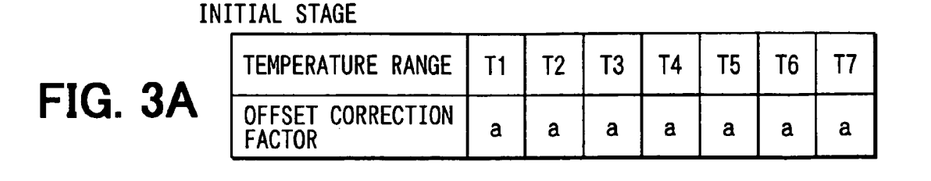
FIGS. 3A–3E are tables explaining how differential pressure sensor outputs are corrected in the ECU.
Figure 3B:
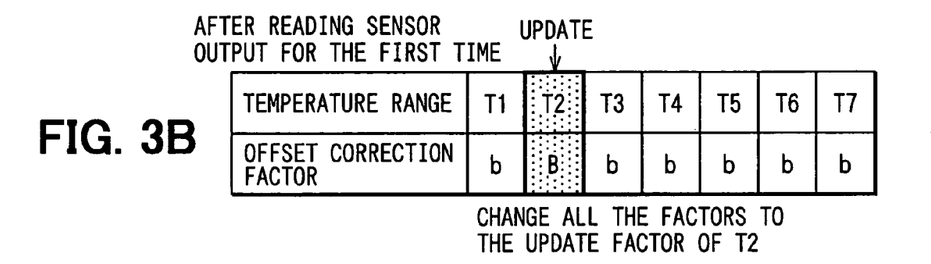

Since the differential pressure becomes zero after the ignition switch is turned off, the sensor output at this time can also be regarded as an offset error. Thus updating of the offset correction factor is repeated frequently. The offset correction map changes as the factors are updated in the following manner: At the first update in the illustrated example, the factor "a" of the temperature range T2 is changed to "B," and the factor "a" of the other temperature ranges T1 and T3–T7 is changed to "b". "b" and "B" are the same values, but the capital letter indicates a temperature range to which the estimated temperature of the differential pressure sensor belongs, which temperature has been obtained at step S102 or S113 together with the sensor output on the basis of which the offset correction factor was updated.

Figure 3C:
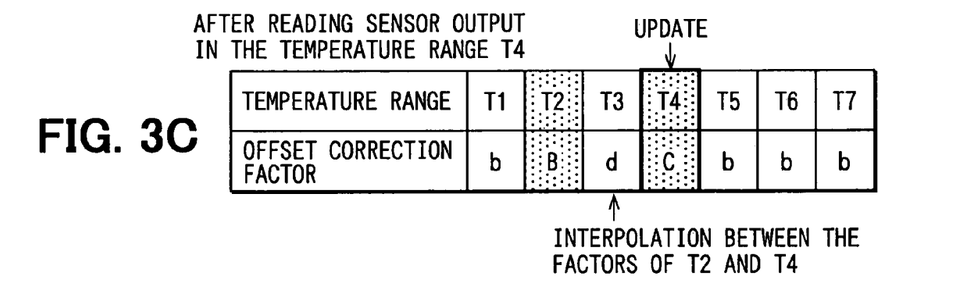
Figure 5:
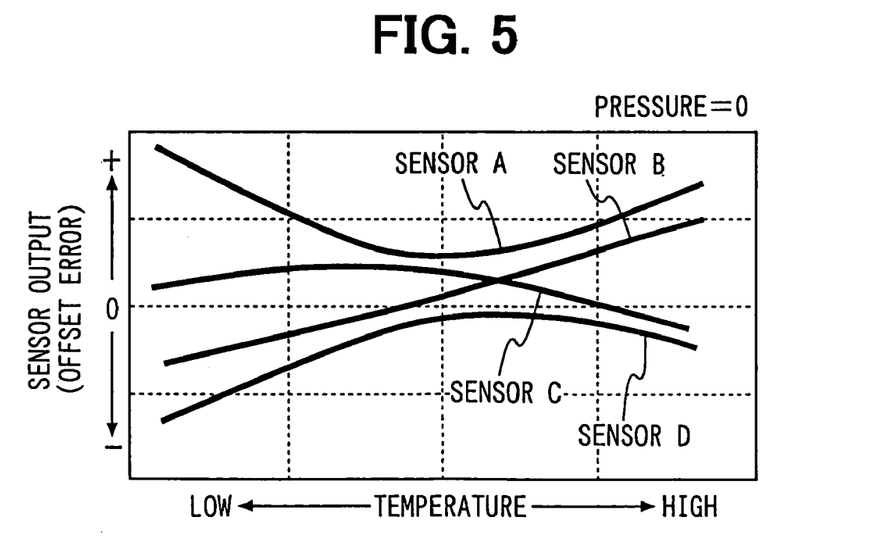
FIG. 5 is a graph showing characteristics of semiconductor pressure sensors used in the exhaust emission control device.

At the second update of offset correction factors, for example, if the estimated temperature of the differential pressure sensor obtained at step S102 or S113 belongs to the temperature range T4, the factor "b" of T4 is changed to "C" as shown in the drawing. "B" of T2 indicates that T2 is the temperature range to which the estimated temperature of the differential pressure sensor belongs, which temperature has been obtained at step S102 or S113 together with the sensor output on the basis of which the offset correction factor was previously updated. The factor "b" of the temperature range T3 sandwiched between the first and second temperature ranges T4 and T2 is changed to "d," which is obtained by interpolation from neighboring factors "B" and "C" of the temperature ranges T2, T4. Since the temperature characteristic of the differential pressure sensor 43 relative to the offset error has a smooth, continuous profile as shown in FIG. 5, the factor obtained here by interpolation is close to a correct value, although not strictly precise. With this method, updating is carried out swiftly because it is not necessary to wait until an estimated temperature of the sensor that belongs to the temperature range T3 is obtained.

Figure 3D:
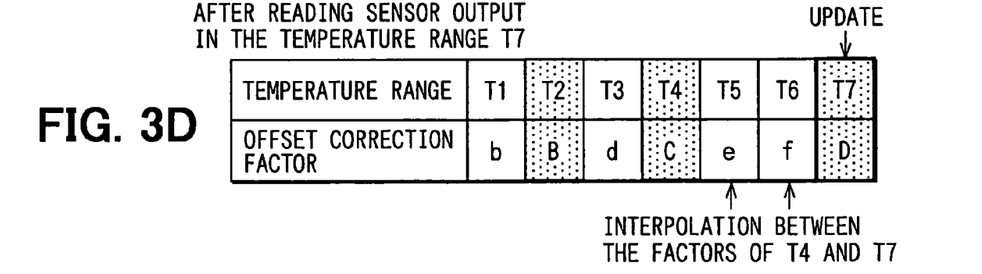
Figure 3E:
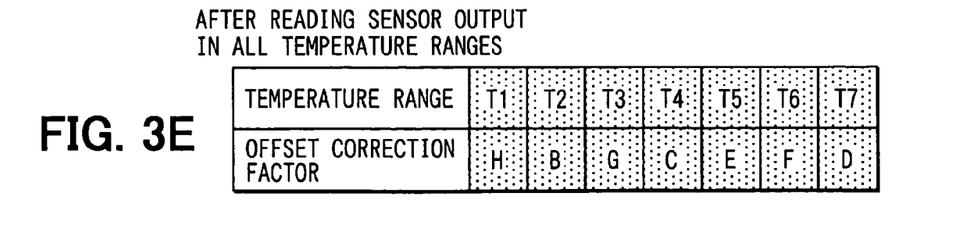

At the third update of offset correction factors, for example, the factor "b" of T7 is changed to "D", and as in the second update, the factor "b" of the temperature ranges T5, T6 sandwiched between T4 and T7 are changed to "e" and "f" by interpolation between the factors "C" and "D" of the temperature ranges T4, T7. Not to mention, the factor "e" is closer to "C" than "D" and "f is closer to "D" than "C." The offset correction factors are likewise updated onwards. The factor "b," which is temporarily given at the first correction information acquiring process, and factors "d," "e," and "f," which are updated by interpolation, are updated every time when an estimated temperature of the sensor that belongs to any of the temperature ranges T1, T3, T5, T6 is obtained by the following correction information acquiring processes in the step S102 or S113 performed afterwards. By thus repeating the steps S102, S113, the estimated temperatures of the sensor for all of the temperature ranges T1–T7 will eventually have been obtained, and all the offset correction factors updated based on the sensor outputs, as shown in the last map of FIG. 3.

Even after all the offset correction factors have been updated based on the sensor outputs that are obtained with the estimated temperatures of the sensor of all the temperature ranges T1–T7, the factors continue to be updated, whenever a new estimated temperature of sensor that belongs to one of the temperature ranges is obtained in the step S102 or S113 performed afterwards, based on the sensor output that was read with the temperature. Any changes in the temperature of the sensor 43 can thereby be absorbed.

FIG. 5 shows the temperature characteristics of semiconductor pressure sensors relative to the sensor outputs when the pressure is zero; the sensor outputs equal to offset errors of each sensor. As is seen, the offset error varies with temperature, the variations between sensors are large, and also, they all have different profiles. According to the invention, not only an estimated temperature of the sensor but also the offset error at this temperature is obtained, and offset correction factors that are set based on the offset errors are stored in a corresponding relationship with temperatures, so as to determine the offset correction factors in accordance with the temperature characteristic of sensors 43 that vary from one to another. By thus correcting the output readings of the sensor 43 in accordance with its temperature characteristics, detection errors are minimized even when there is a large change in the ambient temperature of the sensor 43.

The offset correction map indicates the offset correction factors matched with various temperature ranges. Therefore, the load on the memory 512 can be reduced by setting the number of temperature ranges to be a minimum number necessary to ensure detection precision of differential pressures across the catalyzed DPF 31. Further, any secular changes in the characteristic of the differential pressure sensor 43 are absorbed because the offset correction factor is updated every time when a new factor is obtained for the same temperature range in the correction information acquiring process.

When an offset correction factor is obtained that corresponds to a first temperature range, if another correction factor that corresponds to a second temperature range nearest to the first temperature range has already been obtained and if there is one or more temperature ranges between the first and second temperature ranges, then the offset correction factor of the temperature range sandwiched between the first and second temperature ranges is updated by interpolation between the factors of the first and second temperature ranges. This means that the correction information acquiring process need not be performed for all of the temperature ranges, and yet correction factors are obtained in accordance with the temperature characteristic of the sensor 43.

Figure 6A:
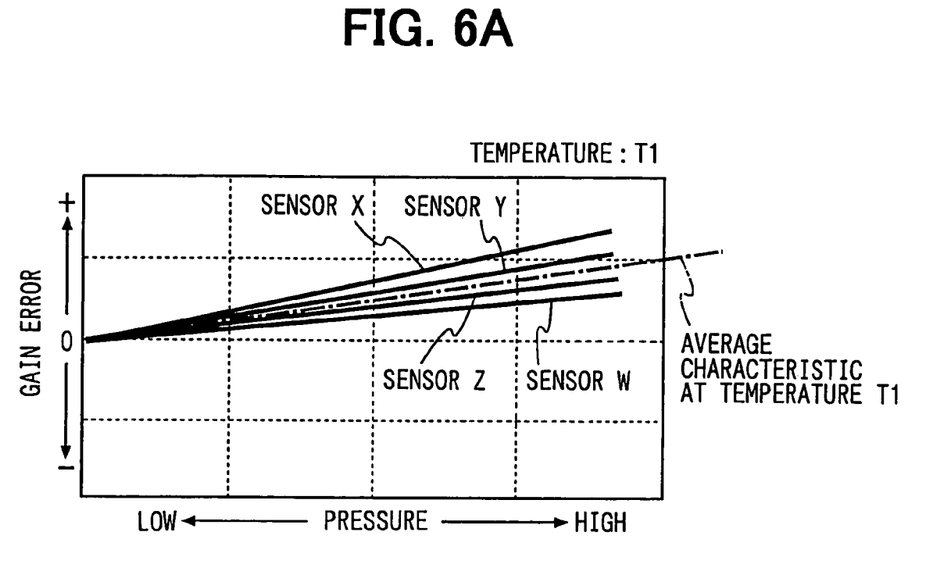
FIGS. 6A and 6B are graphs showing other characteristics of semiconductor pressure sensors used in the exhaust emission control device.
Figure 6B:
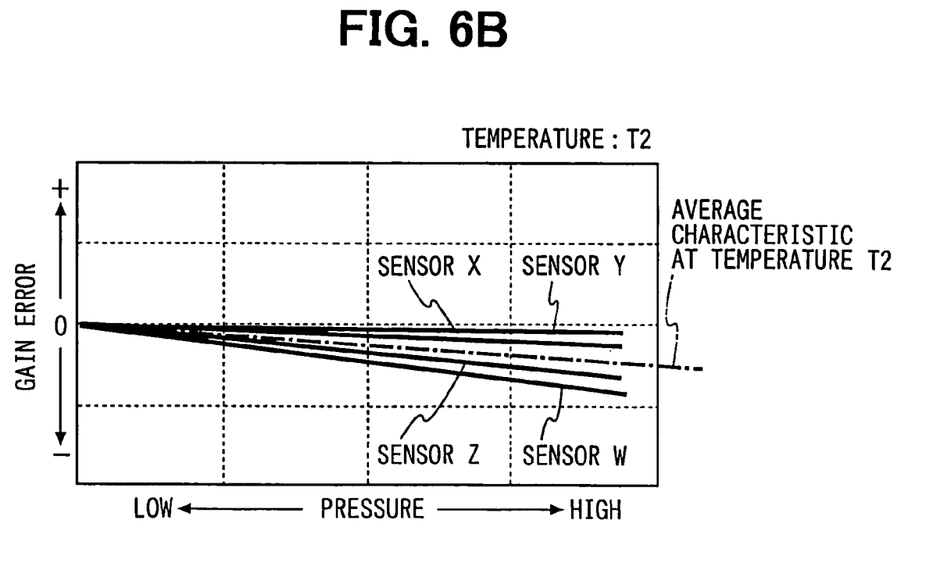

FIG. 6A and FIG. 6B show the gain error characteristics of semiconductor sensors proportional to the pressure at different temperatures. Because the variations between sensors are small if the temperature is the same and because there are no large secular changes, an appropriate gain error correction factor can be determined from an average between the characteristics of various sensors. However, the characteristics of gain errors vary largely with the temperature even when the same sensor is used. According to the invention, average characteristics of gain errors are preliminarily obtained for each temperature range and stored in the memory 512 for the purpose of removing gain errors. Therefore, measurement errors of the differential pressure across the catalyzed DPF 31 are reduced even if there is a large change in the ambient temperature of the sensor 43. This is done only by storing coefficients that are multiplied with the sensor outputs for each temperature range and does not place a heavy load on the memory 512. The timing for regeneration of the catalyzed DPF 31 is thus determined appropriately.

In the present embodiment, when the offset correction factors are updated upon obtaining the offset errors for two temperature ranges, the offset correction factor of the temperature range between the neighboring temperature ranges is also updated by interpolation. Such an updating is not absolutely necessary and may be omitted.

In the above embodiment, when the offset correction factor of one temperature range is updated for the first time, the factors of the other temperature ranges are also updated, but this is not absolutely necessary. At step S107 in the above embodiment, an offset correction factor is obtained based on an estimated temperature that is preliminarily stored for calculating the PM amount from a differential pressure across the catalyzed DPF 31. Alternatively, the offset correction factor may be determined by interpolation between the factor of the temperature range to which the estimated temperature belongs and the factor of a neighboring temperature range.

The interpolation for the updating of the factors of the offset correction map may be curved interpolation as well as linear interpolation. Depending on specification requirements, the updating may be stopped when the offset correction factors of all the temperature ranges have been updated by performing the correction information acquiring process for all the temperature ranges. Also, updating of a factor of the same temperature range may be prohibited. By thus limiting the number of rewriting operations in the memory 512, the load on the control unit and the memory 512 can be reduced.

The offset correction factors may be leveled by multiplying a certain coefficient to the offset errors as noted above. A map that indicates offset errors matched with temperature ranges would be an equivalent of the offset correction map of the above embodiment. The sensor outputs are corrected using both offset correction factors and gain correction factors in the above embodiment, but only either one of them may be used.

The memory 512 includes a device for storing the offset correction map such as an EEPROM, which is rewritable. To limit the number of writings, the updating of the offset correction factor at step S103 may be performed in RAM, and the updated data may be written in EEPROM when updating offset correction factors at step S114. The position where the differential pressure sensor 43 is set should preferably be determined with due consideration so that the output of the intake air temperature sensor 42 well reflects the temperature of the sensor 43. It has been ascertained that the position directly below the engine room R produces good results. Further, the pressure pipes 241, 242 should have a sufficient length so as to eliminate any influence of exhaust gas flowing through the exhaust passage 22.

The intake air temperature sensor 42 that is equipped in any engine is used for estimating the temperature of the sensor 43 in this embodiment. A dedicated temperature sensor may be provided integrally with the sensor 43 or in its vicinity exclusively for the purpose of estimating its temperature.

Figure 7:
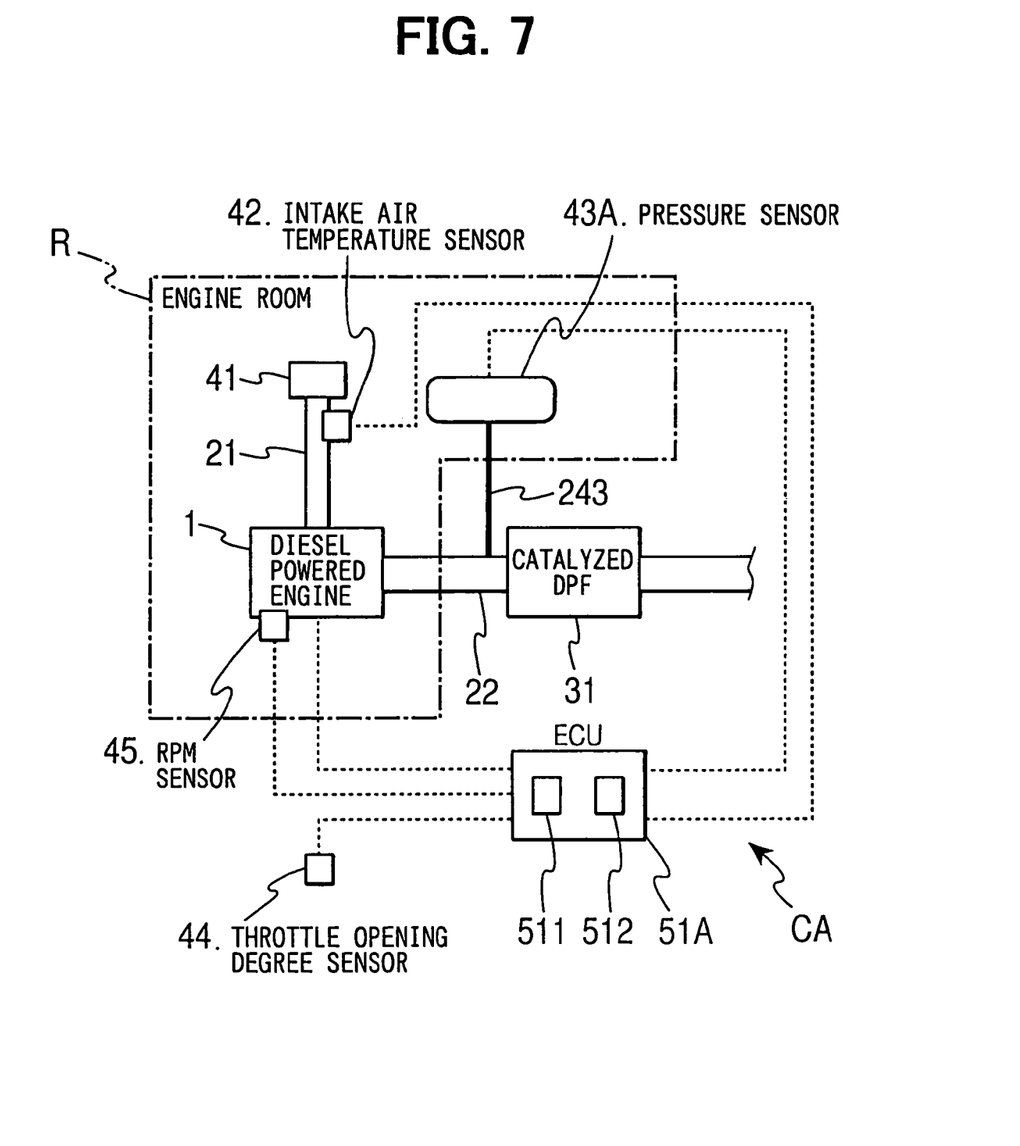
FIG. 7 is a schematic diagram of an internal combustion engine equipped with an exhaust emission control device according to another embodiment of the invention.

Any sensors other than semiconductor pressure sensors may also be used for the differential pressure sensor. FIG. 7 shows an alternative arrangement of an exhaust emission control device CA to which the invention can be applied. This device uses a pressure sensor 43A and only one pressure pipe 243 connected to the exhaust passage 22 upstream of the catalyzed DPF 31. The pressure downstream of the catalyzed DPF 31 is determined by ECU 51A based on a prior-prepared map that stores downstream pressure information in correlation with the operation state of the engine 1 such as engine rpm NE and output torque. A differential pressure across the catalyzed DPF 31 is obtained by subtracting the thus obtained pressure downstream from the upstream pressure reading of the pressure sensor 43A. The invention can advantageously be applied in such an arrangement because detection errors are inevitable due to varying temperature characteristics of sensors. Offset correction factors for the pressure sensor 43A are obtained using the fact that the pressure upstream of the catalyzed DPF 31 should be zero (atmospheric pressure) when the engine is not running (engine rpm NE=0) and the exhaust flow rate is zero.

Alternatively, the pressures upstream and downstream may be detected by separate pressure sensors to determine a differential pressure. In the above embodiment, the sensor outputs of the pressure sensor obtained by the correction information acquiring process are regarded as offset errors because the sensor output, which should be the same at any temperature, is zero when the pressure is zero. In a case where this does not apply, i.e., if the sensor output is not zero when the pressure is zero, then the difference between the sensor output obtained by the correction information acquiring process and the sensor output when the pressure is zero should be regarded as the offset error.

Finally, the present invention is also applicable to an exhaust emission control device with a DPF that does not carry a catalyst on the filter substrate.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for correcting measured differential pressure across a diesel particulate filter disposed in an exhaust passage of an internal combustion engine to determine when to oxidize particulates accumulated in the diesel particulate filter, said method comprising:

estimating temperature of a pressure sensor disposed to measure said differential pressure;

acquiring pressure sensor correction factor information by reading output from the pressure sensor and estimated pressure sensor temperature when the engine is not running, determining offset correction factors for the pressure sensor, the offset errors being the difference between the output from the pressure sensor and an output from the pressure sensor at the time when the pressure is zero, which should be constant irrespective of temperature changes;

storing relationships between the offset correction factors and temperatures of the pressure sensor;

reading the output from the pressure sensor and its estimated temperature when the engine is running for measuring a differential pressure across the diesel particulate filter;

determining an offset correction factor based on said acquired information which corresponds to the estimated temperature; and correcting the output of the pressure sensor with the determined offset correction factor.

2. A method as in claim 1 wherein:
the pressure sensor is a semiconductor pressure sensor.

3. A method as in claim 1 wherein:
each acquired offset correction factor is stored in association with a corresponding one of plural temperature ranges.

4. A method as in claim 3 wherein:
an earlier stored offset correction factor is replaced with a new offset correction factor when one is obtained for a given temperature range by the correction factor acquiring steps.

5. A method as in claim 4 wherein:
a new correction factor is calculated by interpolation for one or more temperature range sandwiched between first and second temperature ranges when (a) an offset correction factor that corresponds to said first temperature range is obtained by the correction information acquiring process, and (b) another correction factor that corresponds to said second temperature range which is nearest to the first temperature range has already been previously obtained by the correction information acquiring process.

6. A method for correcting measured differential pressure across a diesel particulate filter disposed in an exhaust passage of an internal combustion engine to determine when to oxidize particulates accumulated in the diesel particulate filter, said method comprising:

estimating temperature of a pressure sensor disposed to measure said differential pressure;

acquiring pressure sensor correction factor information by reading output from the pressure sensor and estimated pressure sensor temperature when the engine is not running, determining offset correction factors for the pressure sensor, the offset errors being the difference between the output from the pressure sensor and an output from the pressure sensor at the time when the pressure is zero, which should be constant irrespective of temperature changes;

storing relationships between the offset correction factors and temperatures of the pressure sensor;

reading the output from the pressure sensor and its estimated temperature when the engine is running for measuring a differential pressure across the diesel particulate filter;

determining an offset correction factor based on said acquired information which corresponds to the estimated temperature; and correcting the output of the pressure sensor with the determined offset correction factor;

relationships between gain and temperatures of the pressure sensor are also acquired for removing gain errors resulting from gain variations of the pressure sensor which gain is represented by the slope of sensor output as a function of pressure when the engine is running, said acquired relationships including an average gain error for sensors of the same type as the differential pressure sensor, and a gain correction factor is also determined from said acquired gain data corresponding to the estimated sensor temperature also used to correct output of the pressure sensor.

7. An exhaust emission control device for an internal combustion engine including a diesel particulate filter disposed in an exhaust passage of the internal combustion engine for trapping exhaust particulates, and a pressure sensor interposed between a first pressure pipe communicating with the exhaust passage upstream of the diesel particulate filter and a second pressure pipe communicating with the exhaust passage downstream of the filter to detect a differential pressure across the diesel particulate filter to determine when to oxidize particulates accumulated in the diesel particulate filter based on said detected differential pressure, which increases with accumulation of particulates, the device comprising:

means for estimating pressure sensor temperature;

means for setting a correction factor and acquiring correction information by (a) reading output from the pressure sensor and an estimated temperature by the temperature estimating means in accordance with the output from the pressure sensor when the engine is not running, (b) determining offset correction factors for removing offset errors of the pressure sensor, the offset errors being the difference between the read-out output from the pressure sensor and an output from the pressure sensor at the time when the pressure is zero, which should be constant irrespective of temperature changes, and (c) storing relationships between the offset correction factors and temperatures of the pressure sensor in a memory; and means for reading the output from the pressure sensor and the estimated temperature by the temperature estimating means when the engine is running for measuring a differential pressure across the diesel particulate filter, and selecting one of the offset correction factors in the memory which corresponds to the estimated temperature, so as to correct the output of the pressure sensor with the selected offset correction factor.

8. An exhaust emission control device for an internal combustion engine as in claim 7, wherein:
the pressure sensor is a semiconductor pressure sensor.

9. An exhaust emission control device for an internal combustion engine as in claim 7, wherein:
the means for setting a correction factor stores each offset correction factor in association with a corresponding one of plural temperature ranges.

10. An exhaust emission control device for an internal combustion engine as in claim 9, wherein:
the means for setting a correction factor setting means replaces an earlier stored offset correction factor with a new offset correction factor when one is obtained for a given temperature range by the correction factor acquiring process.

11. An exhaust emission control device for an internal combustion engine as in claim 10, wherein:
the means for setting a correction factor calculates a new correction factor by interpolation for one or more temperature range sandwiched between first and second temperature ranges when (a) an offset correction factor that corresponds to said first temperature range is obtained by the correction information acquiring process, and (b) the correction factor that corresponds to said second temperature range which is nearest to the first temperature range has already been previously obtained by the correction information acquiring process.

12. An exhaust emission control device for an internal combustion engine including a diesel particulate filter disposed in an exhaust passage of the internal combustion engine for trapping exhaust particulates, and a pressure sensor interposed between a first pressure pipe communicating with the exhaust passage upstream of the diesel particulate filter and a second pressure pipe communicating with the exhaust passage downstream of the filter to detect a differential pressure across the diesel particulate filter to determine when to oxidize particulates accumulated in the diesel particulate filter based on said detected differential pressure, which increases with accumulation of particulates, the device comprising:
means for estimating pressure sensor temperature;
means for setting a correction factor and acquiring correction information by (a) reading output from the pressure sensor and an estimated temperature by the temperature estimating means in accordance with the output from the pressure sensor when the engine is not running, (b) determining offset correction factors for removing offset errors of the pressure sensor, the offset errors being the difference between the read-out output from the pressure sensor and an output from the pressure sensor at the time when the pressure is zero, which should be constant irrespective of temperature changes, and (c) storing relationships between the offset correction factors and temperatures of the pressure sensor in a memory; and
means for reading the output from the pressure sensor and the estimated temperature by the temperature estimating means when the engine is running for measuring a differential pressure across the diesel particulate filter, and selecting one of the offset correction factors in the memory which corresponds to the estimated temperature, so as to correct the output of the pressure sensor with the selected offset correction factor;
wherein:
the memory also stores relationships between gain correction factors and temperatures of the pressure sensor for removing gain errors resulting from gain variations of the pressure sensor which gain is represented by the slope of sensor output as a function of pressure when the engine is running, said stored relationships including an average gain error for sensors of the same type as the differential pressure sensor, and
the means for selecting also selects a gain correction factor in the memory which corresponds to the estimated temperature by the temperature estimating means and also corrects output of the pressure sensor with the selected gain correction factor.

* * * * *